United States Patent [19]

Brown, Jr. et al.

[11] 4,096,515
[45] Jun. 20, 1978

[54] VIR AUTOMATIC HUE CONTROL WITH PREFERENCE CAPABILITY

[75] Inventors: Charles T. Brown, Jr.; Harry T. Freestone, both of Portsmouth, Va.

[73] Assignee: General Electric Company, Portsmouth, Va.

[21] Appl. No.: 821,062

[22] Filed: Aug. 1, 1977

Related U.S. Application Data

[63] Continuation of Ser. No. 663,483, Mar. 3, 1976, abandoned.

[51] Int. Cl.² ............................................. H04N 9/46
[52] U.S. Cl. ................................................ 358/28
[58] Field of Search .............................. 358/28, 27, 10

[56] References Cited

U.S. PATENT DOCUMENTS 3,950,780  4/1976  Freestone ................................ 358/28

Primary Examiner—John C. Martin

[57] ABSTRACT

With closed loop control, the hue for a color television receiver is automatically set by means of a received VIR signal. Viewer preference of the hue setting is realized by gated addition of the viewer preference offset voltage into the VIR control loop. The viewer preference signal is added into the control loop on all lines other than the VIR line 19. During line 19 the hue control loop is left undisturbed for the establishment of the reference hue setting.

11 Claims, 3 Drawing Figures

VIR AUTOMATIC HUE CONTROL WITH PREFERENCE CAPABILITY

This is a continuation of application Ser. No. 663,483, filed Mar. 3, 1976, now abandoned.

BACKGROUND OF THE INVENTION

The present invention relates to hue control for color television receivers wherein the hue setting is automatically obtained by use of a vertical interval reference (VIR) signal received as part of the video wave.

The present invention is an improvement over the invention set forth in copending patent application Ser. No. 500,082, VIR Chroma System, filed Aug. 23, 1974 by Harry T. Freestone, now U.S. Pat. No. 3,950,780, and assigned to the assignee of the present application. The Freestone application relates in part to a hue control circuit for controlling the hue setting of a color television receiver in response to a VIR signal. In the Freestone application a closed loop control circuit is described for continually updating the phase setting of the color difference detector circuit by comparison of the R-Y output of the color difference detector during the chrominance reference portion of the VIR signal with a known zero chrominance output to insure accuracy of the hue setting of the receiver under the control of the VIR signal. The closed loop hue control circuit insures that the hue setting is always correct regardless of deviations in the phase of the burst signal as transmitted and regardless of drift due to aging of the receiver circuitry for processing the chrominance information. The present invention envisions the utilization of such a closed loop hue control circuit as described in the Freestone application and also allows for viewer preference of the hue setting.

The natural inclination in order to permit viewer preference control of the hue setting of the receiver is to add an offset voltage to the automatic hue control loop so that a fixed voltage is simply added to the hue setting determined under the control of the VIR signal. Unfortunately, such interjection of an offset voltage disturbs the null condition of the feedback loop established when the R-Y output is set to be equal to a known zero chrominance output. The null or zero condition established by the feedback control circuit insures that the hue setting is independent of the saturation setting, so that hue is unaffected by shifts in chroma level. If hue is allowed to become dependent upon the chroma level, expensive precision components are needed to maintain the proper relationship and insure consistent tracking between hue and saturation.

It is accordingly an object of the present invention to add viewer hue preference capability to a color television receiver wherein the hue setting is VIR controlled.

Another object of the present invention is to add viewer hue preference capability to such a color television receiver without resort to precision components.

Another object is to add viewer hue preference while maintaining independence between hue and saturation levels in the receiver.

These and other objects are realized by the present invention by the utilization of a gated adder circuit to selectively combine a viewer hue preference voltage with the VIR hue control voltage. The gated adder circuit is responsive to a line 19 timing pulse to permit hue to be established exclusively under control of the VIR signal during line 19. This allows hue to remain independent of chroma levels and saturation setting. At times other than line 19 the gated adder combines the viewer hue preference voltage with the VIR control voltage to effect fixed offset of the hue setting.

A greater appreciation of the objects and advantages of the invention may be understood by a detailed description taken in conjunction with the drawings, wherein.

In the foregoing description and that which follows, the terms hue and saturation are used due to their more precise meaning, rather than the terms of more common parlance, tint and color.

DETAILED DESCRIPTION

Figure 1:
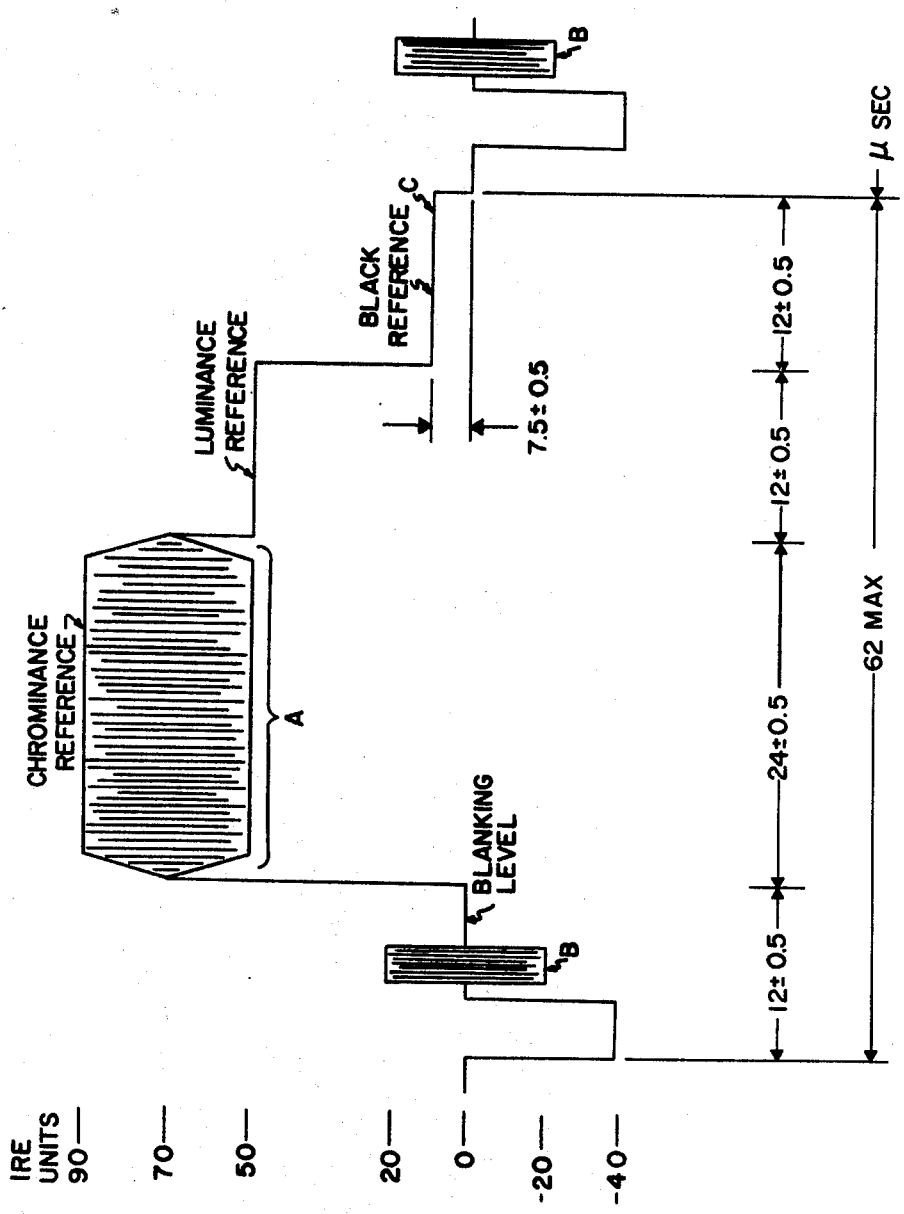
FIG. 1 is a representation of the proposed VIR signal waveform.

Referring now to the drawings, FIG. 1 is a duplicate of FIG. 1A of the aforementioned Freestone application and explained in detail therein. FIG. 1 shows the format of the VIR signal contained on line 19 in the vertical retrace interval wherein various lines not containing video information may be utilized for such purposes. The VIR signal comprises a horizontal sync pulse of −40 IRE units followed by a burst pulse indicated at time B and extending between +20 and −20 IRE units. The burst pulse rests upon a blanking level at zero IRE units. At time A, after the burst pulse and 12 microseconds from the beginning of the VIR signal, is a chrominance reference portion comprising a 3.58 MH$_z$ subcarrier of such phase that when detected the R-Y color difference signal will be zero. Namely, the phase is such that only B-Y and G-Y information will be detected during this time. This chrominance reference portion is 40 IRE units in amplitude and rests on a luminance reference pedestal of 50 IRE units. The chrominance reference portion extends for approximately 24 microseconds and is followed by a luminance reference portion extending for 12 microseconds. A black level reference portion at time C and 7½ IRE units above zero follows the luminance reference portion. The black level reference portion is also 12 microseconds in duration.

Figure 2:
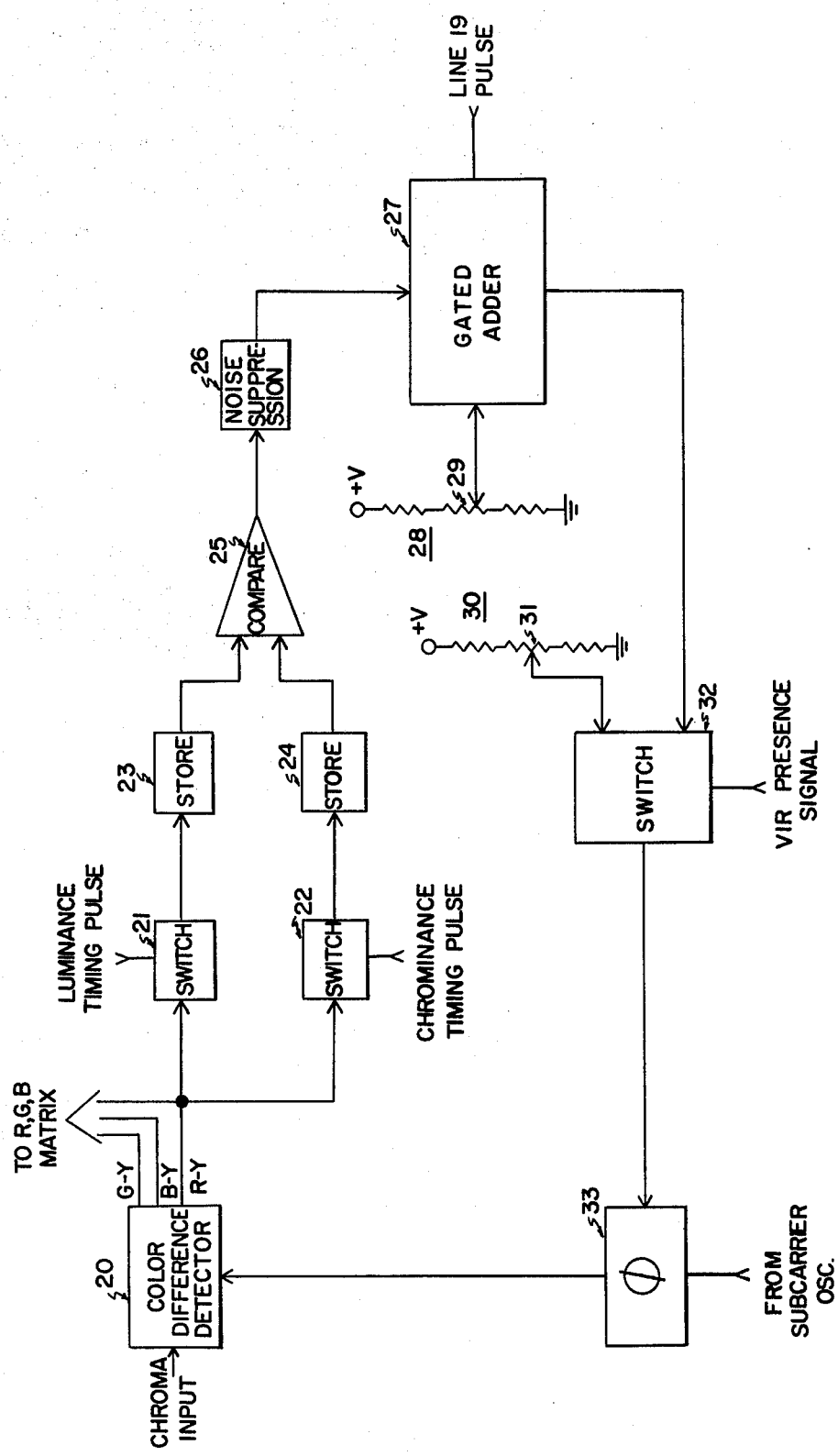
FIG. 2 is a block diagram of a circuit in accordance with the invention.

Referring now to FIG. 2, a portion of the chrominance signal processing elements of a color television receiver are shown to include a color difference detector 20 and a phase controller 33. The color difference detector is responsive to the chrominance information in the received video and to the reconstituted subcarrier for detecting the color difference signals R-Y, B-Y and G-Y. Phase shift circuit 33 adjusts the phase of the reconstituted subcarrier in accordance with a voltage applied thereto such that the phase at which the color difference signals are detected is accordingly adjusted. Changing the phase for detecting the color difference signals is the means by which the hue setting of the receiver is adjusted.

The outputs of the color difference detector are applied to an RGB matrix amplifier (not shown) which may be a separate amplifier or the cathode ray tube itself. The R-Y output of the color difference detector is also coupled to a first switch 21 and to a second switch 22. A timing pulse applied to switch 22 enables the R-Y output to be responded to during the chrominance reference portion of the VIR signal and the level of the R-Y output at this time is stored by a storage device 24.

The R-Y output is again observed during the period of a known zero chrominance signal such as the luminance portion of the VIR signal. Thus, switch 21 is turned on by a luminance timing pulse and storage means 23 stores the level of the R-Y output at this time. The first and second levels of the R-Y output are then compared by a comparing device 25 which may comprise, for example, one quarter of an LM3900 used as, a limited gain IC current sourcing operational amplifier. Such an amplifier is not impedance dependent and does not affect or load down the time constant circuits found in the storage devices 23 and 24.

The output of comparator 25 which may be called the VIR control voltage, is fed back in closed loop fashion to phase control circuit 33 via noise suppression circuit 26, gated amplifier 27 and switch 32. The VIR control voltage when applied to phase control circuit 33 adjusts the phase of the subcarrier (the phase of the subcarrier as regenerated, being determined by the burst signal) so as to shift the phase of detection of color difference detector 20 until the R-Y output during the chrominance reference portion of the VIR signal becomes equal to the R-Y output during the period of the known zero chrominance portion. In this manner the hue setting of the television receiver is determined by the VIR signal.

Noise suppression circuit 26 merely adds stability to the circuit and may comprise an emitter follower integrating circuit. The VIR control voltage developed by comparator 25 is then fed to gated adder circuit 27 which, as explained below, controls the addition of a viewer hue preference voltage into the hue control loop. The switch 32 coupled to receive the output of gated adder 27, in turn allows the VIR control loop to operate during the presence of a VIR signal, the VIR presence signal being generated elsewhere within the television receiver and applied to the switch 32 as a control signal.

Switch 32 merely is a manual/VIR mode control switch which enables operation of the VIR control circuit already described when a VIR signal is present and disables this circuit and establishes the hue setting for the receiver by means of the ordinary tint control made up of potentiometer 31 and resistor divider 30 at times when the VIR signal is not present.

As shown in FIG. 2, gated adder 27 is also responsive to a hue preference voltage present at the wiper of potentiometer 29. Potentiometer 29 forms part of voltage divider 28 connected between a positive voltage +V and ground and preferably comprises a viewer operated control. As will be explained in greater detail with regard to FIG. 3, the voltage established by the viewer preference control is added with the VIR control voltage output of comparator 25 by gated adder 27 at all times other than line 19. Thus, the control loop for establishing the hue setting of the receiver under the control of the VIR signal is undisturbed during line 19 and at other times a viewer preference offset voltage is added in so that the hue setting is adjusted accordingly.

Figure 3:
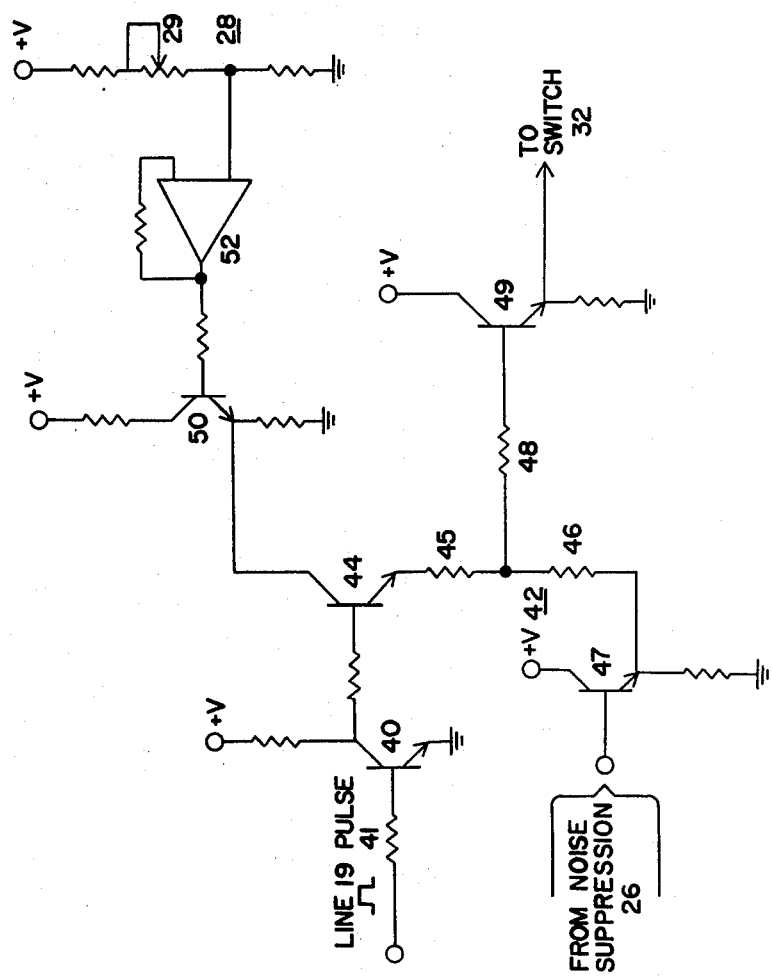
FIG. 3 is a circuit diagram of a gated adder in accordance with the invention.

Details of the gated adder circuit 27 are shown in FIG. 3. The various inputs to the gated adder, as shown in FIG. 2, i.e., the hue preference control voltage from potentiometer 29, the VIR hue control signal from noise suppression circuit 26 and the line 19 timing pulse, are again shown in FIG. 3. The hue preference control voltage divider 28 is shown in the upper right hand corner of this figure. The preference control voltage from potentiometer 29 is shown being coupled to one leg, resistor 45, of an adder network 42 by means of a voltage follower 52 (which may, for example, comprise another quarter of an LM3900 IC operational amplifier) and emitter followers 50 and 44. Emitter follower 44 is under control of switch transistor 40. Transistor 40 in turn has its conduction controlled by the line 19 pulse. When this positive pulse appears at the base of transistor 40, this transistor turns ON, bypassing the bias voltage for transistor 44, to cause transistor 44 to be turned OFF, thereby preventing the hue preference voltage from being applied to the adder circuit 42 during line 19.

Resistor 46 makes up the second leg of adder circuit 42 and is connected at one end to the emitter of transistor 47 to receive the VIR control voltage from comparator 25 via noise suppression circuit 26. Thus, at all times other than line 19 the preference voltage, as established by potentiometer 29 and present on resistor 45, is added to the VIR control voltage present on resistor 46 and the combined voltage applied via emitter follower transistor 49 to switch 32, and in turn to phase controller 33, as shown more fully in FIG. 2.

What is claimed and desired to be secured by Letters Patent of the United States is:

1. In a color television receiver, an automatic hue control circuit responsive to the VIR signal when present on a predetermined line of the received video wave, said automatic hue control circuit comprising:
   chrominance signal processing means,
   control means coupled to said chrominance signal processing means and responsive to said VIR signal when present to develop a control signal,
   means generating a hue preference signal,
   means generating a timing signal the period of which includes said predetermined line,
   and gate means coupling said control signal and said hue preference signal to said chrominance signal processing means under control of said timing signal so that a reference hue setting is established by said control signal during the timing signal period and a preference offset to said reference hue setting is established by said hue preference signal at times other than said timing signal period.

2. The invention recited in claim 1 wherein said gate means includes means to combine said control signal with said hue preference signal, the combined signal being applied to said chrominance signal processing means to adjust hue at times other than the period of said timing signal.

3. The invention recited in claim 2 further comprising:
   hue control means generating a hue setting signal,
   and switch means controlled by a VIR presence signal indicative of the presence of the VIR signal in said video wave, said switch means being coupled to said hue control means and to said gate means to apply said combined signal outputted by said gate means to said chrominance signal processing means when said VIR signal is present in said video wave and applying said hue setting signal to said chrominance signal processing means when said VIR signal is absent from said video wave.

4. In a color television receiver an automatic hue control circuit responsive to the VIR signal when present on a predetermined line in the received video wave, said VIR signal containing a chrominance reference portion of such phase that one color difference signal should be zero, said automatic hue control circuit comprising:

chrominance signal processing means including detector means responsive to said video wave for detecting the color difference signals therein, means coupled to said detector means and responsive to said one color difference signal output during the interval of said chrominance reference portion to establish a first level and responsive to a reference voltage indicative of a zero chrominance signal to establish a second level, comparing means responsive to said first and second levels to generate a control signal, means generating a line indicating signal indicative of said predetermined line, means generating a preference signal corresponding to a preferred hue setting for said receiver, and gate means responsive to said line indicating signal to couple said control signal to said chrominance signal processing means during said predetermined line to adjust the phase of detection of said detector means to maintain a minimum difference, if any, between said first and second levels and thereby set the hue of said receiver in accordance with said VIR signal, said gate means additionally coupling said preference signal to said chrominance signal processing means during all other lines of said video wave to offset the hue setting in accordance with said preference signal from the setting established during said predetermined line.

5. In a color television receiver, an automatic hue control circuit responsive to the VIR signal when present on a predetermined line in the received video wave, said VIR signal containing a chrominance reference portion of such phase that one color difference signal should be zero, and another portion having zero chrominance content, said automatic hue control circuit comprising:

chrominance signal processing means including detector means responsive to said video wave for detecting the color difference signals therein, means coupled to said detector means and responsive to said one color difference signal output during the interval of said chrominance reference portion to establish a first level, and responsive to said one color difference signal output during the interval of the zero chrominance content portion to establish a second level.

comparing means responsive to said first and second levels to generate a control signal, means generating a timing signal, the period of which includes said predetermined line, means generating a preference signal corresponding to a preferred hue setting for said receiver, and gate means responsive to said timing signal to apply said control signal to said chrominance signal processing means during the period of said timing signal to adjust the phase of detection of said detector means to maintain a minimum difference if any between said first and second levels to thereby establish a hue reference setting for said receiver, and applying the combination of said preference signal and said control signal to said chrominance signal processing means during times other than the period of said timing signal to establish a preference offset from said reference setting.

6. The invention recited in claim 5 wherein said means for generating a preference signal is a viewer accessible control for generating a fixed deviation from the hue reference setting controlled by said VIR signal.

7. The invention recited in claim 6 further comprising:

means for generating a VIR presence signal indicative of the presence of said VIR signal in said video wave, hue control means for generating a hue settling signal, and switch means controlled by said VIR presence signal and coupled to said hue control means and to said gate means to apply the combination of said control signal and said preference signal outputted by said gate means to said chrominance signal processing means when said VIR signal is present in said video wave and applying said hue setting signal to said chrominance processing means when said VIR signal is absent from said video wave.

8. In a color television receiver, an automatic hue control circuit responsive to the VIR signal when present on a predetermined line of the received video wave, said automatic hue control circuit comprising:

chrominance signal processing means, means coupled to said chrominance signal processing means and responsive to said VIR signal when present to develop a reference signal, means generating a hue preference signal, means generating a timing signal the period of which includes the time period of said VIR signal, and means responsive to said reference signal and to said hue preference signal under control of said timing signal to establish a reference hue setting for said chrominance signal processing means during the timing signal period and a preference hue setting at times other than said timing signal period.

9. The invention recited in claim 8, wherein said means responsive to said reference signal and to said hue preference signal includes means to add said reference and hue preference signals at times other than said timing signal period, such that said preference hue setting is the sum of said reference and hue preference signals.

10. In a color television receiver, an automatic hue control circuit responsive to the VIR signal when present on a predetermined line of the received video wave, said automatic hue control circuit comprising:

chrominance signal processing means, means coupled to said chrominance signal processing means and responsive to said VIR signal when present to develop reference signals, means generating a hue preference signal, means generating a timing signal the period of which includes the time period of said VIR signal, and means responsive to at least one of said reference signals and said hue preference signal to establish under control of said timing signal a reference hue setting for said chrominance signal processing means during the timing signal period and a preference hue setting at times other than said timing signal period.

11. The invention recited in claim 10, wherein said means responsive to at least one of said reference signals and said hue preference signal includes means to add at least one of said reference signals with said hue preference signal at times other than said timing signal period, such that said preference hue setting is the sum of at least one of said reference signals and said hue preference signal.

* * * * *